United States Patent
Kalkanoglu et al.

(10) Patent No.: US 9,259,860 B2
(45) Date of Patent: Feb. 16, 2016

(54) ROOFING PRODUCT INCLUDING RECYCLED ROOFING MATERIAL

(75) Inventors: Husnu M. Kalkanoglu, Swarthmore, PA (US); Gregory F. Jacobs, Oreland, PA (US); Paul A. Benensky, Trappe, PA (US)

(73) Assignee: CertainTeed Corporation, Malvern, PA (US)

( * ) Notice: Subject to any disclaimer, the term of this patent is extended or adjusted under 35 U.S.C. 154(b) by 267 days.

(21) Appl. No.: 12/938,026

(22) Filed: Nov. 2, 2010

(65) Prior Publication Data

US 2011/0104422 A1    May 5, 2011

Related U.S. Application Data

(60) Provisional application No. 61/257,702, filed on Nov. 3, 2009.

(51) Int. Cl.
*B05D 1/36* (2006.01)
*B05D 3/02* (2006.01)
(Continued)

(52) U.S. Cl.
CPC ............. *B29B 17/00* (2013.01); *B32B 11/12* (2013.01); *E04D 1/20* (2013.01); *E04D 5/10* (2013.01); *B29K 2067/00* (2013.01); *B32B 37/12* (2013.01); *B32B 38/08* (2013.01); *B32B 38/1841* (2013.01); *B32B 2305/30* (2013.01); *B32B 2305/70* (2013.01); *B32B 2307/744* (2013.01);
(Continued)

(58) Field of Classification Search
CPC ..... C08L 95/00; E04D 5/10; E04D 2001/005; E04D 1/26; E04D 1/28; B32B 2419/06; B32B 2395/00; B32B 2305/70; B32B 2307/7145; B32B 2307/243; B32B 37/24; B32B 38/08; B32B 2315/02; Y10T 156/1089; Y10T 428/14; Y10T 428/141; Y10T 428/1414
USPC ..................... 428/143, 41.8, 320.2
See application file for complete search history.

(56) References Cited

U.S. PATENT DOCUMENTS 4,233,353 A    11/1980    Bondoc et al.
4,726,846 A    2/1988    Jackson et al.
(Continued)

FOREIGN PATENT DOCUMENTS

CA    2719586 A1    5/2011
CA    2719589 A1    5/2011

OTHER PUBLICATIONS

Hometime Video Publishing, Inc. "Hometime How to Roofing—Types of Shingles & Repairs", 2 pgs, 2008.
(Continued)

*Primary Examiner* — Patricia L Nordmeyer
(74) *Attorney, Agent, or Firm* — Alexander H. Plache; Abel Law Group, LLP

(57) ABSTRACT

A roofing product can include a base material and a first coating including a bituminous material. In one embodiment, the first coating can include recycled roofing material adjacent to the base material. The recycled roofing material has a first recycled roofing content of less than 40 weight %. In another embodiment, the roofing product can include a base material and a first coating including a bituminous material. The first coating is adjacent to the base material. The roofing product can also include particles along a first exposed surface of the roofing product, wherein the particles include recycled roofing material particles. Methods of forming such roofing products are also disclosed.

17 Claims, 5 Drawing Sheets

(51) Int. Cl.
  *B05D 3/06* (2006.01)
  *B05D 5/10* (2006.01)
  *B32B 11/12* (2006.01)
  *B32B 3/26* (2006.01)
  *B32B 33/00* (2006.01)
  *B29B 17/00* (2006.01)
  *E04D 1/20* (2006.01)
  *E04D 5/10* (2006.01)
  *B29K 67/00* (2006.01)
  *B32B 37/12* (2006.01)
  *B32B 38/08* (2006.01)
  *B32B 38/18* (2006.01)

(52) U.S. Cl.
  CPC ....... *B32B2309/68* (2013.01); *B32B 2315/085* (2013.01); *B32B 2395/00* (2013.01); *B32B 2419/06* (2013.01); *Y02W 30/62* (2015.05); *Y10T 428/14* (2015.01); *Y10T 428/141* (2015.01); *Y10T 428/1476* (2015.01); *Y10T 428/24372* (2015.01); *Y10T 428/249994* (2015.04)

(56) References Cited

U.S. PATENT DOCUMENTS

| | | | |
|---|---|---|---|
| 5,017,426 A | 5/1991 | Greiser et al. | |
| 5,052,162 A | 10/1991 | Bush et al. | |
| 5,340,391 A * | 8/1994 | Grzybowski | 106/281.1 |
| 5,720,933 A | 2/1998 | Srinivasan | |
| 5,848,755 A | 12/1998 | Zickell et al. | |
| 6,039,914 A | 3/2000 | Gehrke et al. | |
| 6,120,838 A | 9/2000 | Zickell | |
| 6,134,856 A * | 10/2000 | Khan et al. | 52/536 |
| 6,194,519 B1 | 2/2001 | Blalock et al. | |
| 6,220,329 B1 | 4/2001 | King et al. | |
| 6,228,503 B1 * | 5/2001 | Zickell | 428/489 |
| 6,286,273 B1 | 9/2001 | Villela et al. | |
| 6,296,912 B1 * | 10/2001 | Zickell | 428/40.1 |
| 6,355,132 B1 | 3/2002 | Becker et al. | |
| 6,585,813 B2 | 7/2003 | Kiik et al. | |
| 6,983,571 B2 | 1/2006 | Felton | |
| 7,125,601 B1 | 10/2006 | Pinault et al. | |
| 7,182,889 B2 | 2/2007 | Aisenbrey | |
| 7,198,735 B2 | 4/2007 | Aisenbrey | |
| 7,238,408 B2 | 7/2007 | Aschenbeck et al. | |
| 7,241,500 B2 | 7/2007 | Shiao et al. | |
| 7,541,059 B2 | 6/2009 | Aschenbeck et al. | |
| 7,592,066 B2 | 9/2009 | Shiao et al. | |
| 7,651,559 B2 | 1/2010 | Whitaker et al. | |
| 7,833,339 B2 | 11/2010 | Whitaker et al. | |
| 7,838,575 B2 | 11/2010 | Lang et al. | |
| 8,168,032 B2 | 5/2012 | Kalkanoglu et al. | |
| 2001/0007709 A1 * | 7/2001 | Phillips et al. | 428/148 |
| 2001/0008674 A1 | 7/2001 | Smith et al. | |
| 2002/0040557 A1 | 4/2002 | Felton | |
| 2002/0160151 A1 | 10/2002 | Pinault et al. | |
| 2002/0189189 A1 | 12/2002 | Kupczyk | |
| 2003/0008094 A1 | 1/2003 | Zickell | |
| 2003/0068469 A1 | 4/2003 | Aschenbeck et al. | |
| 2003/0091795 A1 | 5/2003 | Kiik et al. | |
| 2003/0209305 A1 | 11/2003 | Smith et al. | |
| 2004/0014385 A1 * | 1/2004 | Greaves et al. | 442/148 |
| 2005/0072110 A1 | 4/2005 | Shiao et al. | |
| 2005/0140042 A1 | 6/2005 | Aisenbrey | |
| 2005/0166956 A1 | 8/2005 | Aisenbrey | |
| 2005/0170141 A1 | 8/2005 | Bacon et al. | |
| 2005/0204675 A1 | 9/2005 | Snyder et al. | |
| 2005/0233663 A1 | 10/2005 | Lee et al. | |
| 2005/0257465 A1 | 11/2005 | Felton | |
| 2005/0281999 A1 | 12/2005 | Hofmann et al. | |
| 2006/0194023 A1 | 8/2006 | Teng | |
| 2006/0265990 A1 | 11/2006 | Kalkanoglu et al. | |
| 2007/0020436 A1 | 1/2007 | Teng et al. | |
| 2007/0026195 A1 | 2/2007 | Pinault et al. | |
| 2007/0039703 A1 | 2/2007 | Lee et al. | |
| 2007/0054129 A1 | 3/2007 | Kalkanoglu et al. | |
| 2007/0077361 A1 | 4/2007 | Shiao et al. | |
| 2007/0144077 A1 | 6/2007 | Quaranta et al. | |
| 2008/0029210 A1 | 2/2008 | Swei et al. | |
| 2008/0044626 A1 | 2/2008 | Aschenbeck et al. | |
| 2008/0060777 A1 | 3/2008 | Wilson et al. | |
| 2008/0209825 A1 | 9/2008 | Smith | |
| 2008/0220167 A1 | 9/2008 | Wisniewski et al. | |
| 2008/0248241 A1 | 10/2008 | Kalkanoglu et al. | |
| 2008/0248244 A1 * | 10/2008 | Kalkanoglu et al. | 428/143 |
| 2009/0117329 A1 | 5/2009 | Leitch et al. | |
| 2009/0163625 A1 | 6/2009 | Lang et al. | |
| 2009/0220743 A1 | 9/2009 | Aschenbeck et al. | |
| 2009/0229491 A1 | 9/2009 | Harmon | |
| 2009/0291260 A1 | 11/2009 | Kiik et al. | |
| 2010/0064937 A1 | 3/2010 | Harmon et al. | |
| 2010/0126663 A1 | 5/2010 | Kalkanoglu et al. | |
| 2010/0129667 A1 * | 5/2010 | Kalkanoglu et al. | 428/426 |
| 2010/0151199 A1 | 6/2010 | Shiao et al. | |
| 2010/0167013 A1 | 7/2010 | Cruz et al. | |
| 2011/0086201 A1 | 4/2011 | Shiao et al. | |
| 2011/0104422 A1 | 5/2011 | Kalkanoglu et al. | |
| 2011/0104440 A1 | 5/2011 | Kalkanoglu et al. | |

OTHER PUBLICATIONS

Paul Kemp "Laminated Roofing vs. Composition Roofing", 3 pgs, 1999-2013.
Jericho McCune "How to Install Laminated Shingles", 1 pg, printed Jan. 18, 2013.

* cited by examiner

ROOFING PRODUCT INCLUDING RECYCLED ROOFING MATERIAL

RELATED APPLICATION

This is related to and claims priority under 35 U.S.C. §119(e) to U.S. Patent Application No. 61/257,702 entitled "Roofing Product Including Recycled Roofing Material and Method of Forming the Same" by Kalkanoglu et al. filed on Nov. 3, 2009, which is assigned to the current assignee hereof and incorporated herein by reference in its entirety.

FIELD OF THE DISCLOSURE

The present disclosure relates to roofing products and methods of forming roofing products, and more particularly to, roofing products including recycled roofing material and methods of forming the same.

RELATED ART

Roofing products can be in different forms, such as shingles or membranes. The roofing products can include a base material and a bituminous material. The base material can include wood, a wood derivative (e.g., paper), fiberglass, organic fibers (e.g., polyester), or the like. Conventionally, the bituminous material can include asphalt, a filler, and potentially a plasticizer. A variety of fillers have been used including limestone, talc, fly ash, coal fines, or other relatively inert materials. Limestone has been mostly commonly used as filler in roofing products due to its relatively low cost and its compatibility with a wide variety of materials used for roofing products. Traditionally, recycled roofing material has not been used in roofing products.

Currently, recycled roofing materials are being considered for use in forming new roofing products. Methods have been proposed to rejuvenate the bituminous material and to remove roofing nails from the recycled roofing material. Regardless whether a roofing product includes or does not include recycled roofing material, the roofing product must still be able to withstand the rigors of shipping and handling, installation, and exposure to outdoor environments for several years. Further, during storage, shipping, handling, and until finally installation, the roofing product should be able to be in contact with another roofing product without the roofing products prematurely adhering to each other.

BRIEF DESCRIPTION OF THE DRAWINGS

Embodiments are illustrated by way of example and are not limited in the accompanying figures.

Figure 1:
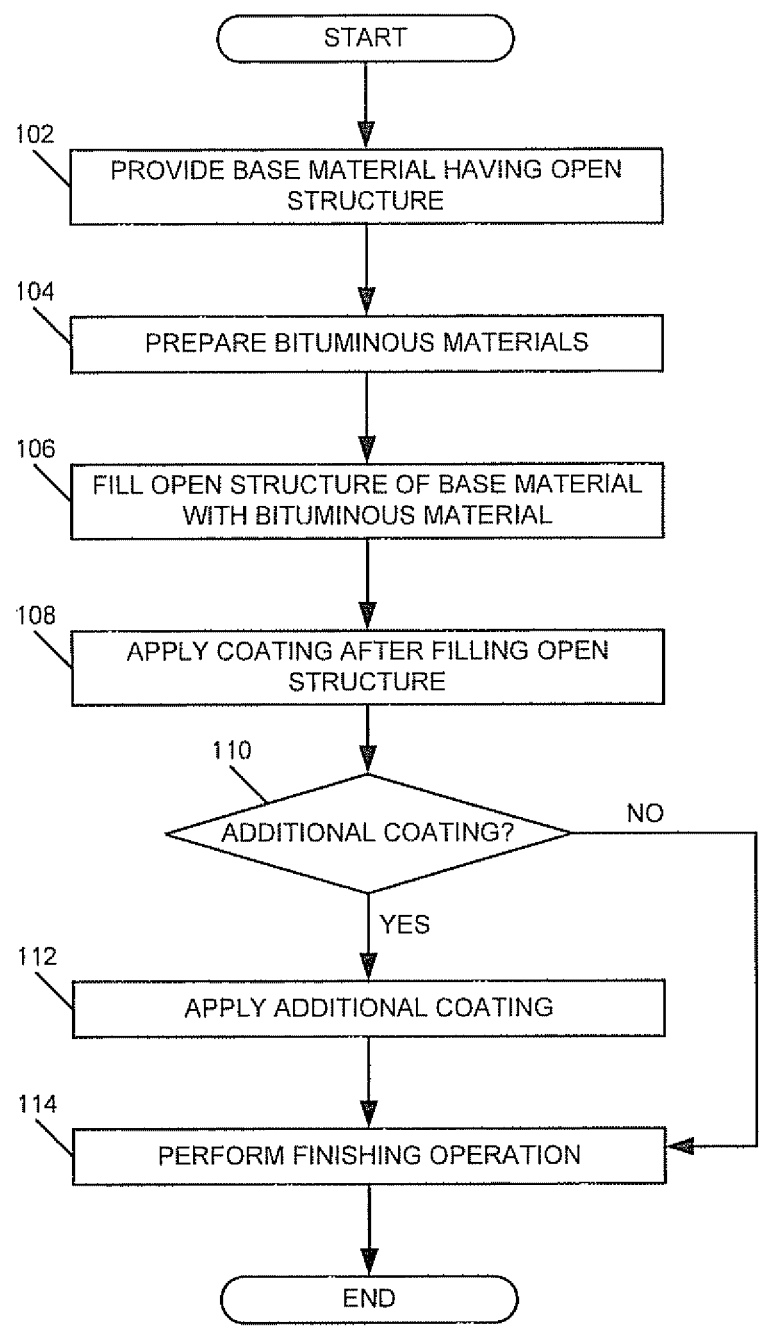
FIG. 1 includes a process flow diagram illustrating an exemplary method of forming a roofing product.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

Before addressing details of embodiments described below, some terms are defined or clarified. The term "abrasive particle" is intended to mean a particle having a hardness at least as hard as a ceramic base material used or to be used within the same roofing product.

With respect to dimensions, the length and width are dimensions that extend along the principal surfaces of a roofing article. The width is measured in a direction that would extend vertically along a roof when the roofing article would be installed, and the length is measured in a direction perpendicular to the width and along the roof. The length and width can be substantially in a same plane, such as a plane of an underlying roofing support structure when the roofing article would be installed. Each of the length and width is greater than the thickness.

The term "actinic radiation" is intended to mean radiation that is intentionally performed, or directed at or on a surface or portion of the roofing product, and results in cross-linking, oxidation, another change, or any combination thereof, of a surface or other portion of the roofing product to attain a specific property. The term "actinic radiation" does not include incidental radiation, such as sunlight, fluorescent lighting, or other lighting at a storage facility or other building, or other similar radiation during the manufacture, storage, shipping, or installation of the roofing product.

The term "perimeter volume" is intended to mean a volume generally defined as contained by outer surfaces of an object. For example, a fiberglass mat can include glass fibers in the form of an open structure. The outer surfaces of the fiberglass mat are used to determine the perimeter volume. The volume occupied by only the glass fibers within the fiberglass mat may be substantially less than the perimeter volume.

The term "principal surfaces," with respect to a roofing article or product, is intended to mean a pair of opposite surfaces of such roofing article or product, wherein one of the surfaces lies or would lie farther from a structure to which the roofing article or product is installed or intended to be installed, and the other surface of such roofing article or article lies or would lie closer to a structure to which the roofing article or article is installed or intended to be installed. When installed, the principal surface farther from the structure may be directly exposed to an outdoor environment, and the other principal surface may contact the structure or a different roofing article or product that lies between the other principal surface and the structure.

The term "recycled roofing material" is intended to mean a material that includes at least some roofing article content that is or will become a coating or other component within a roofing product. Recycled roofing material may include at least some material that is not recycled.

The term "roofing article" is intended to mean a roofing product (recently manufactured or used) or a byproduct of a roofing manufacturing process that can be recycled and used to make a newly manufactured roofing product.

The term "roofing product" is intended to mean a final product or an intermediate product of a roofing manufacturing process.

As used herein, the terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the roofing product arts and corresponding manufacturing arts.

The inventors have discovered that one or more particular coatings of a roofing product can include a recycled roofing material having a recycled roofing content relatively lower, such as less than 40 weight %, where an application for such roofing product allows for some, but not too much recycled roofing content. For example, one or more coatings of the roofing product can include a recycled roofing material having a relatively lower recycled roofing content, where the recycled content is used as an additive to modify some aspect or property of the roofing product. In another example, one or more coatings of the roofing product can include a recycled roofing material having a relatively lower recycled roofing content, where post-industrial waste is employed and a recycled waste stream resulting therefrom is not sufficient to provide a relatively higher recycled roofing content. In another embodiment, the recycled roofing content can be no greater than 30 weight %, in a further embodiment, the recycled roofing content can be no greater than 25 weight %, and in still another embodiment, the recycled roofing content can be no greater than 20 weight %.

In one embodiment, a coating can include a high content of recycled roofing material. Such a coating may be relatively stiff. An adjacent coating may include a lower recycled roofing material or no recycled roofing material, may include a higher additive chemicals content (e.g., a higher plasticizer content), may be less oxidized, may have another suitable difference, or any combination thereof to compensate for the relatively stiffer coating. In a particular embodiment, a roofing product can include complementary pairs of coatings that synergistically provide for more desirable properties, lower manufacturing costs, provide another benefit or any combination thereof.

FIG. 1 includes a process flow of an exemplary, non-limiting method of forming a roofing product in accordance with an embodiment. At block 102, a base material is provided. For example, the base material can include a portion of a roll. The base material can include a ceramic base material, such as fiberglass, alumina, silica or another vitreous or non-vitreous ceramic base material. In one embodiment, the base material includes a fiberglass mat. In another embodiment, the base material can include polyester, wood, paper cellulose fiber, or another non-ceramic material. The base material has a length, a width, and a thickness. The base material also has principal surfaces that are opposite one another, such as principal surfaces whose areas are defined by the length and width on opposite sides of the base material.

The base material can have an open structure that allows a bituminous material or other material to flow within and partially or completely fill the open structure. The open structure can be in the form of pores, channels, interstitial openings within a matrix, another suitable void, or any combination thereof. The open structure can be characterized as the volume of the base material that is not occupied by the particular material (e.g., paper, glass fibers, etc.) and may be expressed as a mat weight. In an embodiment, the mat weight can be at least approximately 25 $g/m^2$ (0.5 $lb/100\ ft^2$), at least approximately 40 $g/m^2$ (0.8 $lb/100\ ft^2$), or at least approximately 60 $g/m^2$ (1.2 $lb/100\ ft^2$). In another embodiment, the mat weight can be no greater than approximately 200 $g/m^2$ (4.0 $lb/100\ ft^2$), no greater than approximately 170 $g/m^2$ (3.5 $lb/100\ ft^2$), or no greater than approximately 130 $g/m^2$ (2.7 $lb/100\ ft^2$). In a particular embodiment, the mat weight can be in a range of approximately 60 $g/m^2$ (1.3 $lb/100\ ft^2$) to approximately 120 $g/m^2$ (2.5 $lb/100\ ft^2$). When a ceramic base material is used, the ceramic base material can include an oxide (e.g., silica, alumina, ceria, zirconia, or the like), a nitride (e.g., aluminum nitride, silicon nitride, or the like), a carbide (e.g., tungsten carbide, silicon carbide, or the like), or any combination thereof. In another embodiment, a mat can include polyester, wood, paper cellulose fiber or another non-ceramic material.

The method includes, at block 104, preparing bituminous materials to be used as portions of the roofing product, such as a coating, a material to fill the open structure of the base material, another portion of the roofing product, or any combination thereof. The bituminous materials include asphalt, roofing articles, or both, and may include a filler, additive chemicals, another suitable component, or any combination thereof. The actual composition of the bituminous material may depend on where in the roofing product the bituminous material will be used. Three types of bituminous materials are described below: (i) virgin asphalt or filled virgin asphalt mixture (after adding filler and potentially additive chemicals); (ii) bituminous material having at least 40 weight % recycled roofing material content ("high recycled content bituminous material"); and (iii) bituminous material having less than 40 weight % recycled roofing material content, a relatively higher additive chemicals content as compared to the recycled roofing material, or any combination thereof ("low recycled content bituminous material"). As used in this specification, low recycled content bituminous material may or may not include a recycled roofing article. When the low recycled content bituminous material has substantially no recycled roofing article, such low recycled content bituminous material has a recycled roofing content of zero.

In one embodiment, each of the high recycled content bituminous material and the low recycled content bituminous material can include virgin asphalt or filled virgin asphalt mixture. Virgin asphalt and filled virgin asphalt mixture includes asphalt that has not been previously incorporated into a roofing product and is processed to achieve desired properties. In an embodiment, asphalt, as received, can be oxidized to reduce the amount of volatile chemicals, partially polymerize a compound within the asphalt, or a combination thereof. The process can be used to increase the softening point of the asphalt to over approximately 90° C. (approximately 200° F.) or a penetration distance (100 g at 25° C., ASTM D5) of less than 18 to 22 dmm. In a particular embodiment, asphalt is oxidized by flowing pressurized air into a tank of asphalt heated to approximately 230° C. (approximately 450° F.). For the purposes of this specification, asphalt as received or after the oxidation process, but before adding solids or chemicals, is referred to herein as virgin asphalt and can be used to form filled virgin asphalt mixture.

As compared to one another, the high recycled content bituminous material can have lower virgin asphalt content as compared to the bituminous base material and the low recycled content bituminous material. For example, the low recycled content bituminous material may have a virgin asphalt content of at least approximately 20 weight %, 30 weight %, or 50 weight %, and in another embodiment, the virgin asphalt content may be no greater than approximately 95 weight %, 90 weight %, or 80 weight %. The high recycled content bituminous material may have no virgin asphalt or may have virgin asphalt content of at least approximately 5 weight %, 10 weight %, 15 weight %, or 20 weight %, and in another embodiment, the virgin asphalt content in the high content roofing material may be no greater than approximately 80 weight %, 60 weight %, or 40 weight %.

As stated, each of the low recycled content bituminous material and the high recycled content bituminous material can also include a filler. A filler allows a relatively less expensive material to displace relatively more expensive asphalt within a roofing product. The filler can include relatively inert solid particles. More particularly, the filler can include limestone particles, sand, talc, clay, coal fines, gypsum, calcite, another similar material, or any combination thereof.

For a bituminous material that is used to fill the open structure of the base material, the selection of filler material may depend on the composition of base material within the roofing product. When the base material is not a ceramic base material (e.g., wood, paper, polyester), the filler material may include any filler previously described. For a ceramic base material, the material used for filler may depend on the particular material within the ceramic base material and whether the ceramic base material provides a principal support within the roofing product. For example, the roofing product can include a laminated roofing product, as described in further detail later in this specification. Such a laminated roofing product can include a plurality of sheets laminated together, where each sheet includes a ceramic base material. In a particular embodiment, the ceramic base material in a particular sheet can provide principal support for the roofing product, whereas the ceramic base material in another particular sheet does not provide principal support for the roofing product.

A filler that will not significantly scratch or otherwise damage the ceramic base material that provides principal support for the roofing product can be used to reduce or prevent failure of the roofing product due to tearing of the ceramic base material. For example, limestone particles, talc, clay, non-abrasive coal fines, gypsum, calcite, another similar material, or any combination thereof can be included within a filler used with a fiberglass mat providing principal support for the roofing product. In another example, limestone particles, sand, other similar abrasive filler materials, or any combination thereof, can be used as a filler for a fiberglass mat or other ceramic base material that does not provide principal support for the roofing product, or when the ceramic base material that provides principal support for the roofing product includes a harder material, such as alumina.

In another embodiment, the filler used with the bituminous materials prepared at block 104 can include roofing granules or other abrasive particles, such as sand or other abrasive particles. Roofing granules can include materials that are harder than glass and may scratch glass fibers within a fiberglass mat. Nonetheless, a relatively small amount of roofing granules or other abrasive particles may be used within a perimeter volume of a ceramic base material, such as a fiberglass mat, without causing a substantial failure of a roofing product having a ceramic base material, even when the ceramic base material provides principal support for the roofing product. For instance, a bituminous material having no greater than 5 weight % roofing granules (or other abrasive particles) or no greater than 3 weight % roofing granules (or other abrasive particles) can be used. In another embodiment, the bituminous material has no greater than 1 weight % roofing granules (or other abrasive particles), and in a further embodiment, the bituminous material is substantially free of roofing granules (or other abrasive particles). More details regarding roofing granules are described in further detail within this specification.

In a shingle embodiment, the bituminous materials prepared at block 104 can include at least approximately 45 weight % of filler, at least approximately 50 weight % of filler, or at least approximately 55 weight % of filler. In another shingle embodiment, the bituminous material may include no greater than approximately 80 weight % of filler, no greater than approximately 75 weight % of filler, or no greater than approximately 70 weight % of filler. In a membrane embodiment, the bituminous material may include substantially no filler or may include at least approximately 5 weight % of filler, or at least approximately 10 weight % of filler. In another membrane embodiment, the bituminous material may include no greater than approximately 60 weight % of filler, no greater than approximately 50 weight % of filler, or no greater than approximately 40 weight % of filler. In a further embodiment, the bituminous material can include a higher or a lower filler content than the weight percents recited.

Additive chemicals that can be used with the bituminous material include a process oil, a plasticizer, a polymer modifier, another suitable compound, or any combination thereof. The process oil can include a napthenic oil, an aliphatic oil, or an aromatic oil, another suitable oil, or any combination thereof. Another exemplary compound can include styrene-butadiene-styrene, styrene-ethylene-butylene-styrene, styrene-isoprene-styrene, acrylonitrile-butadiene-styrene, atactic polypropylene, isotactic polypropylene, high density polyethylene, ethylene-polypropylene copolymer, another suitable plasticizer or polymeric compound, or any combination thereof. A thermoplastic olefin can be formed using a metallocine catalyst and include a block copolymer polypropylene, a polyethylene-propylene rubber, or another suitable material. Typically, the additive chemicals are in the form of solids or liquids at room temperature; however, the additive chemicals do not include asphalt, fillers, or roofing granules. For simplicity, the additive chemicals are referred to herein in the plural even if only a single chemical is used.

In an embodiment, the high recycled content and low recycled content bituminous materials may include substantially none of the foregoing additive chemicals, at least approximately 5 weight % of additive chemicals, or at least approximately 10 weight % of additive chemicals. In another embodiment, the bituminous materials may include no greater than approximately 40 weight % of additive chemicals, no greater than approximately 30 weight % of additive chemicals, or no greater than approximately 25 weight % of additive chemicals. In a further embodiment, the bituminous materials can include a higher or a lower additive chemical content than the weight percents recited. When comparing the high recycled content bituminous material and the low recycled content bituminous material, the low recycled content bituminous material may have a higher additive chemicals content. The higher additive chemicals content can help to improve its impact resistance. In a particular embodiment, the low recycled content bituminous material may have one or more plasticizers that are not present or are present at a lower content within the high recycled content bituminous material.

In a particular embodiment, recycled roofing material, as described below, may be used in the bituminous material prepared at block 104, such as the high recycled content bituminous material and the low recycled content bituminous material. When the base material of the roofing product is not a ceramic base material (e.g., wood, paper, polyester, etc.), or in a ceramic base material that does not provide principal support for the roofing product, the selection of the components and content of those components within the recycled roofing material is more flexible and may include any recycled roofing material as previously described with respect to the high recycled content bituminous material or the low recycled content bituminous material.

However, for a ceramic base material that provides principal support for the roofing product, the components and content of the components within the recycled roofing material, if any recycled roofing material is used within the bituminous material used to fill the open structure of the base material, may depend on the particular material within the ceramic base material. In a particular embodiment, when the ceramic base material provides principal support for the roofing product and includes a fiberglass mat, the particles within the recycled roofing material can include limestone particles or any other material that will not scratch or abrade the fiberglass, and when the ceramic base material includes alumina, the filler particles can include limestone particles, sand, or any other material that will not scratch or abrade the alumina. Thus similar to the description with respect to filler, roofing granules may be used in greater quantities for an alumina base material than a fiberglass base material.

In a particular embodiment, the recycled roofing material used in the low recycled content and high recycled content bituminous materials can include recycled roofing articles (e.g., membranes, shingles, roofer's felt, etc.), other materials recovered when removing roofing articles from a structure, virgin asphalt or filled virgin asphalt mixture, an additive chemical, another component, or any combination thereof. Recycled roofing articles can include post-industrial roofing articles, pre-consumer roofing articles, post-consumer roofing articles, or any combination thereof. Post-industrial roofing articles can include partially or completely manufactured roofing articles that remain within the possession of the manufacturer. An example of a recycled roofing article can include a post-industrial roofing article that does not meet a product specification. Post-consumer roofing articles can include roofing articles that have been installed on a structure owned or controlled by a consumer, such as a homeowner or a business. Pre-consumer roofing articles are completely manufactured roofing articles outside the possession of the manufacturer and before the roofing articles are installed. An example of pre-consumer roofing articles can include a bundle of shingles that is damaged by a shipping company or a roofing contractor during shipping or handling, or obsolete products, such as roofing articles with outdated colors or designs, or expired products (e.g., a product that should not be installed on a roof due to age of the product).

Roofing articles that are being recycled vary greatly with respect to time and exposure to different environmental conditions. Some roofing articles may be recently scrapped, such as post-industrial roofing articles that do not meet product specifications, and therefore, cannot be sold as product. Post-industrial roofing articles can also include cut-outs from the shaping of the shingles during manufacturing (e.g., the cut-outs may correspond to slots that were formed in a finished three-tab shingle). Other roofing articles may be pre-consumer roofing articles that may have been stored at a warehouse or other locations for months. Roofing articles may be post-consumer roofing articles that may have been installed on different structures for years that experience different environmental conditions. For example, roofing articles installed on a structure exposed to more sun will have received more ultraviolet radiation than roofing articles installed on a different structure exposed to less sun. As time elapses and effective exposure to ultraviolet radiation increases, the composition of materials within the roofing articles can change. For example, volatile chemicals or plasticizers may be driven off or degraded, and further polymerization of an asphalt material may occur.

Particular chemicals or compounds can be used with recycled roofing material to replace, replenish, or otherwise provide the same or other compounds that have been volatilized or have become degraded. Such compounds can include a process oil, a plasticizer, a polymer modifier, another suitable compound, or any combination thereof. As compared to the bituminous material using virgin asphalt as a sole bituminous source, the additive chemicals may make up a larger fraction of the starting materials when preparing the bituminous material that includes recycled roofing articles. In one embodiment, virgin asphalt or filled virgin asphalt mixture can be used in recycled roofing material with recycled roofing articles, and in another embodiment, virgin asphalt, filled virgin asphalt mixture, or both are not used. If the high recycled content bituminous material, the low recycled content bituminous material, or both, are to be relatively more flexible or less stiff, a relatively higher additive chemical content may be used. Conversely, if the high recycled content bituminous material, the low recycled content bituminous material, or both, are to be relatively less flexible or stiffer, a relatively lower additive chemical content may be used.

With respect to recycled roofing articles, in an embodiment, the recycled roofing article content within recycled roofing material may be at least approximately 5 weight %, 10 weight %, 15 weight %, or 20 weight %, and in another embodiment, the recycled roofing article content may be no greater than approximately 95 weight %, 90 weight %, or 80 weight %. The high recycled content bituminous material has a greater recycled roofing article content than the low recycled content bituminous material. The low recycled content bituminous material may or may not include recycled roofing articles (i.e., 0 weight % recycled roofing articles).

In another particular embodiment, recycled roofing material used in the low recycled content and high recycled content bituminous materials may include wood, paper, fiberglass, polyester, or another material that may have been part of a base material used in shingles or a membrane of a roofing article. Additionally, or alternatively, the recycled roofing material may include one or more metals from nails, flashing, or from metal fragments generated when making the recycled material (e.g., fragments from steel balls or exposed surfaces within a mixing or grinding apparatus). These metals can include iron, aluminum, copper, chromium, nickel, or the like, in elemental form (i.e., the metal element by itself and not part of a compound) or as part of an alloy. In an embodiment, the recycled roofing material may be substantially free of the wood, paper, fiberglass, polyester other base material, and metals content. In another embodiment, the wood, paper, fiberglass, polyester, another base material, or metals content within the recycled roofing material may be at least approximately 5 weight %, 10 weight %, or 15 weight %, and in another embodiment, the wood, paper, fiberglass, polyester, other base material or metals content within the recycled roofing material may be no greater than approximately 30 weight %, 25 weight %, or 20 weight %.

Many different materials have been described for use within the recycled roofing material. Any detectable amount of a residual material from roofing articles, a roof, or equipment used to process recycled roofing material can provide proof that recycled roofing material is present within a roofing product. These residual material can include the roofing granules or sand, a roofing article base material (e.g., fiberglass or polyester mat, wood, paper, or the like), a roofing article coating (e.g., an acrylic material), a metal from roofing nails, wood from the roof decking (e.g., plywood), parts of a gutter, downspout, or screen, a material from grinding media (e.g., ceramic or steel balls) or a drum used in breaking down the roofing articles when processing the recycled roofing material, or any combination thereof. Thus, in a non-limiting embodiment, even 0.1 weight % of any of the residual materials within a particular coating or other component of a roofing product indicates that recycled roofing material is present.

In an illustrative embodiment, the presence of recycled roofing material can be detected by determining the level of acid-insoluble solids disposed within a coating of a roofing product or a portion of such coating. Roofing granules and parting agents, such as sand, talc, or the like, if present along the principal surfaces of the roofing product, are removed from the exposed surfaces of the roofing product. The remaining coating of the roofing product or portion thereof is placed in an appropriate solvent to extract the bituminous material. One or more solvents can be used, and the extraction can be performed as a single wash or a series of washes. In a particular embodiment, a Soxhlet method can be used. After the bituminous material is removed, solids remain and include a mat (e.g., fiberglass, polyester, cellulose, etc.), filler, and solids from the recycled roofing material. If the particular coating or portion thereof includes an embedded mat (e.g., fiberglass, polyester, cellulose, etc.) that is part of the base structure (that is, not residual pieces of a mat within the recycled roofing material), the mat can be removed at this time to form remaining solids.

The remaining solids can then be further processed by disposing the solids in an acid. Acid washing can be used to determine the presence and amount of collateral abrasive content in nonabrasive fillers used in roofing materials. More particularly, limestone is primarily calcium carbonate, and calcium carbonate can be dissolved in an HCl solution. Other materials, such as silica, roofing granules, and metals and metals alloys, do not significantly dissolve in an HCl solution. Thus, by washing the solids in the HCl solution, calcium carbonate from the limestone is dissolved, and acid-insoluble solids remain. The acid-insoluble solids can then be vacuum filtered onto a tared filter paper. After drying and removing the filter paper, the acid-insoluble solids are typically silica, roofing granules, and metals and metals alloys. When the filler principally includes a material other than calcium carbonate, the selection of the acid can be changed to remove the other material while at least some other solids remain.

For a conventional roofing product having limestone filler, the amount of acid-insoluble solids is relatively low because a small amount of the limestone may include silica or another similar material. A particular conventional roofing product that does not include any recycled roofing material may have an acid-insoluble solids content of approximately 1.6% of the remaining solids. Thus, a conventional roofing product without any recycled roofing material has less than 2% of the remaining solids.

Clearly, a roofing product including recycled roofing material has a significantly higher acid-insoluble solids content than a conventional roofing product without any recycled roofing material. The recycled roofing material includes roofing granules, many of which are silicates, sand, residual fiberglass mat, metals or metal alloys from a grinding drum or grinding media, or potentially other sources of acid-insoluble materials that may not be present in a conventional roofing product, or if present, at significantly lower levels. Therefore, a coating of a roofing product or portion of such coating including recycled roofing material can have at least 2% acid-insoluble solids (as a percentage of the remaining solids), and in a particular embodiment, at least 3% acid-insoluble solids.

In a particular embodiment in which the coating or portion of such coating includes approximately 3 weight % recycled roofing content, the amount of acid-insoluble solids may be approximately 4.0% of the remaining solids. In another particular embodiment in which the coating or portion of such coating includes approximately 6 weight % recycled roofing content, the amount of acid-insoluble solids may be approximately 5.0% of the remaining solids. In still another particular embodiment in which the coating or portion of such coating includes approximately 12 weight % recycled roofing content, the amount of acid-insoluble solids may be approximately 8.4% of the remaining solids. Thus, the content of acid-insoluble solids provides a good indicia regarding the presence and level of recycle roofing material within a coating of a roofing product or portion of such coating.

Particle size distribution may be an additional indicator that recycled roofing articles are present within a roofing product. A particle size distribution can have characteristic particle size. In a particular embodiment, the characteristic particle size can be an averaged particle size, such as an average, a geometric mean, or a median. Alternatively, the characteristic particle size may be expressed as a percentile. For example, the characteristic particle size may be the particle size at the $5^{th}$ percentile, $95^{th}$ percentile, or other percentile value. For a $95^{th}$ percentile value, the characteristic particle size would mean that 95 percent all particles are a particular particle size or smaller. In still another embodiment, the characteristic particle size can be the largest particle size of all the particles present. In another embodiment, the characteristic particle size may be determined using a different criterion.

In a particular embodiment, the characteristic particle size within the recycled roofing material is smaller than the characteristic particle size used within conventional asphalt shingles. In a particular embodiment, the characteristic particle size within the recycled roofing material is no more than 70%, 50%, or 30% of the characteristic particle size used within conventional asphalt shingles.

Figure 2:
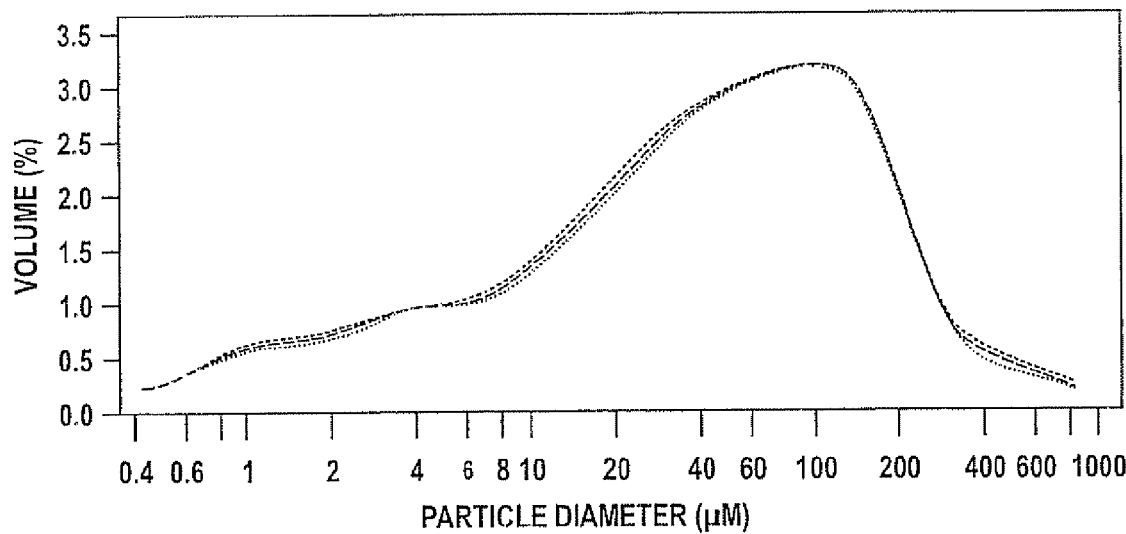
FIG. 2 includes an illustration of a particle size distribution of conventional limestone filler within an asphalt coating.
Figure 3:
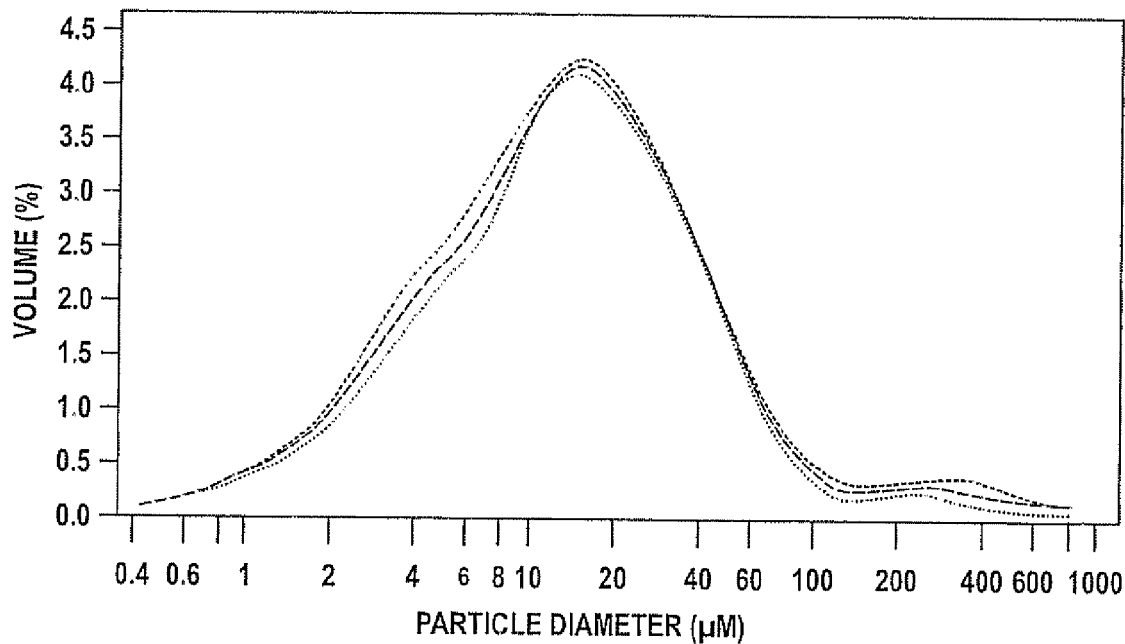
FIG. 3 includes an illustration of a particle size distribution of recycled roofing material.

FIG. 2 includes an illustration of a particle size distribution of conventional limestone filler within an asphalt coating as measured by a Coulter counter, and FIG. 3 includes an illustration of a particle size distribution of recycled roofing material. The recycled roofing material can be prepared using a Union Process Attritor Model 1-S, approximately 9 mm (3/8 inch) grinding media and a rotational speed of between 100 to 650 rotations per minute.

In this particular embodiment, the characteristic particle size can be a median particle size or the size at the $5^{th}$ or $95^{th}$ percentile. Referring to FIG. 2, for the conventional limestone filler, the median particle size is 44 microns with $5^{th}$ and $95^{th}$ percentiles at 1.4 and 260 microns, respectively. Referring to FIG. 3, for the recycled roofing material, the median particle size is 14 microns, about 1/3 the median particle size of the conventional limestone filler, and the $5^{th}$ and $95^{th}$ percentiles at 1.8 and 81 microns, respectively. Thus, the recycled roofing material can have a tighter distribution of particle size as compared to limestone filler used in conventional asphalt shingles. In another embodiment, a different apparatus, a different size of grinding media, a different rotational speed, or any combination thereof can be used to prepare the recycled roofing material. Thus, a smaller median particle size and an even tighter distribution of particle sizes may be achieved.

In another embodiment, the particle size distribution of particles in a coating can include a plurality of modes, wherein a particular mode is indicative of recycled material, another particular mode is indicative of a conventional filler, a further particular mode is indicative of filled virgin asphalt mixture or other fresh content, or any combination thereof. For example, one of the modes may correspond to a particle size distribution as illustrated in FIG. 3. In still another embodiment, any significant deviation from the particle size distribution in FIG. 2 may also be indicative of recycled roofing material being present.

The process used in preparing the recycled roofing material may be carried out as a batch or continuous operation. The processing apparatus may include steel balls, ceramic grinding media, or other items that may help to break up the recycled roofing articles into smaller pieces. In a particular embodiment, virgin asphalt or filled virgin asphalt mixture can be heated above its softening point. Additive chemicals can be combined with the virgin asphalt or filled virgin asphalt mixture before or after the virgin asphalt is above its softening point. Recycled roofing articles can be combined with the heated virgin asphalt or filled virgin asphalt mix, and potentially additive chemicals. If needed or desired additional filler particles can be added to achieve a desired particle content for the recycled roofing material. In another particular embodiment, all components for the recycled roofing material can be combined within the apparatus before or after heating. In still another particular embodiment, a different order of adding the components may be used. After reading this specification, skilled artisans will appreciate that the order in which components are first combined can be tailored to the particular needs or desires for a particular apparatus and application. The recycled roofing material can be in a softened state and optionally may be filtered or magnetically separated during or after preparing the recycled roofing material to remove roofing nails or other undesired items.

Recycled roofing articles can be ground within a media mixer. In a particular embodiment, the media mixer is an attritor that includes a mixing vessel, mixing media, and an agitator. The mixing vessel, mixing media, agitator, and virgin asphalt or filled virgin asphalt mixture are heated to approximately 210° C. (approximately 400° F.), with the agitator rotating at approximately 100 revolutions per minute (rpm) for approximately 5 minutes. After mixing media and virgin asphalt or filled virgin asphalt mixture have been mixed, recycled roofing articles can be added.

Before adding the recycled roofing articles, the amount of recycled roofing articles to be added can be determined in order to achieve a desired amount of filler (solids) that is to be present within the mixture. The roofing articles can include parts of fiberglass mats, roofing granules, sand or talc (from parting agents), limestone, or any combination thereof. If the mixture is to include approximately 50 weight % filler, the mixture can include approximately 40 weight % virgin asphalt or filled virgin asphalt mixture and approximately 60 weight % recycled roofing articles. As the desired amount of filler or composition of the recycled roofing articles within the mixture changes, the relative amounts of virgin asphalt and recycled roofing articles can likewise change.

The recycled roofing articles can be added all at once into the vessel or may be added in segments. When the mixture includes approximately 60 weight % recycled roofing articles, the recycled roofing articles can be added in two (halves) or three (thirds) different stages, with each stage having approximately the same amount of recycle roofing articles. During each stage, the agitator can be stopped and the desired amount of recycled roofing articles can slowly be added. The mixture can be mixed with the agitator rotating at approximately 100 rpm for approximately 1 minute, and then the rotational speed of the agitator can be increased to approximately 350 rpm for approximately 1 minute. The process can be iterated for the remainder of the stages until all of the recycled roofing articles are added.

After all of the recycled roofing articles have been mixed as described above, the resulting mixture can be mixed with the agitator at a rotational speed of approximately 350 rpm for approximately 20 minutes to form a ground mixture. Throughout the process, the temperature setpoint can remain at approximately 210° C. (approximately 400° C.). The ground mixture can then be drained or otherwise removed from the vessel. The ground mixture may have the particle size distribution as illustrated in FIG. 3. While the process has been described with respect to an attritor, skilled artisans will appreciate that other equipment and processes can be used to produce the ground mixture. For example, a rotating ball mill is another media mixer that can be used in forming the ground mixture.

Table 1 includes properties of three different batches of the ground mixture. In Table 1, the softening point is determined using ASTM D-36-06, the viscosity is determined using ASTM D-4402-06, the penetration is determined using ASTM D-5 as described in ASTM D-449-03, and the stain test is determined using ASTM D-2746-07. As used in the tables in this specification, "Total Solids" refers to solids content after asphalt is removed.

TABLE 1

|  | | Target | Grind 1 | Grind 2 | Grind 3 |
|---|---|---|---|---|---|
| Softening Point (° F.) | | | 134 | 136 | 136 |
| Viscosity (cps) @ | 300° F. | | 875 | 1050 | 1075 |
| | 325° F. | | 500 | 575 | 588 |
| | 350° F. | | 250 | 350 | 363 |
| Penetration (dmm) | 77° F. | | 38 | 35 | 37 |
| | 115° F. | | 176 | 170 | 162 |
| Remaining Solids (wt %) | | 50% | 45.7 | 47.0 | 47.7 |
| Acid-Insoluble Solids (% of Remaining Solids) | | 55% | 50.8 | 50.0 | 51.1 |
| Stain (1/64s of an inch) | | | 11.5 | 8 | 7.5 |

Information in the Table 1 can be expressed in metric units. The softening point of Grinds 1, 2, and 3 are approximately 57° C., 58° C., and 58° C., respectively. The temperatures for determining the viscosities are approximately 149° C., 163° C., and 177° C., and the temperatures for determining the penetrations are approximately 25° C. and 46° C. The stain distance of Grinds 1, 2, and 3 are approximately 4.6 mm, 3.2 mm, and 3.0 mm, respectively.

In other embodiments, different levels of total solids content can be different for the ground mixture. The amount of virgin asphalt added may be adjusted to achieve a desired total solids content, viscosity, or both.

In an embodiment, the ground mixture can be used as a recycled roofing material. In another embodiment, another material may be added to reduce the recycled content for the recycled roofing material. A filled virgin asphalt mixture can include virgin asphalt, limestone or other fillers, and potentially additive chemicals. A combination of the filled virgin asphalt mixture and the ground mixture can be combined to form the recycled roofing material. In a particular embodiment, the recycled roofing material can include approximately 5 weight % of the ground mixture with the remainder substantially the filled virgin asphalt mix (recycled roofing material is approximately 3% recycled roofing content). In another embodiment, the recycled roofing material can include approximately 10 weight % of the ground mixture with the remainder substantially the filled virgin asphalt mixture (recycled roofing material is approximately 6% recycled roofing content). In yet another embodiment, the recycled roofing material can include approximately 20 weight % of the ground mixture with the remainder substantially the filled virgin asphalt mixture (recycled roofing material is approximately 12% recycled roofing content). In still other embodiment, part or all of the virgin asphalt can be replaced by styrene-butadiene-styrene (SBS) or another polymer. In a particular embodiment, 10 weight % SBS can be used.

Table 2 below includes data for a roofing product that includes a fiberglass mat that is filled with filled virgin asphalt mixture (control), 10 weight % ground mixture with the remainder filled virgin asphalt mixture (10% mixture), and 20 weight % ground mixture with the remainder filled virgin asphalt mixture (20% mixture). Tests as described with respect to Table 1 can be used to obtain the data in Table 2. In addition, the tear test can be determined using ASTM D-1922 as modified in D-228-08.

TABLE 2

|  | | Target | Control | 10% mixture | 20% mixture |
|---|---|---|---|---|---|
| Softening Point (° F.) | | 205-225 | 226 | 212 | 197 |
| Viscosity (cps) | 350° F. | | 4188 | 3000 | 1800 |
| | 375° F. | 1500-3000 | 2000 | 1580 | 988 |
| | 400° F. | | 1138 | 875 | 625 |
| Penetration (dmm) | 77° F. | | 7 | 11 | 13 |
| | 115° F. | | 15 | 18 | 25 |
| Remaining Solids (wt %) | | 50% | 55.5 | 55.2 | 53.3 |
| Acid-Insoluble Solids (% of Remaining Solids) | | | 1.63 | 6.62 | 11.01 |
| % recycle added based on Acid-Insoluble Solids | | | | 10.3 | 19.4 |
| Stain (1/64s of an inch) | | | 5.5 | 6.5 | 6.3 |
| Tear Test (g) | CD | 1700 | 1800 | 1400 | 1300 |
| | MD | | 1300 | 1100 | 1000 |

Information in the Table 2 can be expressed in metric units. The softening point of Control, 10% mixture, and 20% mixture are approximately 108° C., 100° C., and 92° C., respectively. The temperatures for determining the viscosities are approximately 177° C., 191° C., and 204° C., and the temperatures for determining the penetrations are approximately 25° C. and 46° C. The stain distance of Control, 10% mixture, and 20% mixture are approximately 2.2 mm, 2.6 mm, and 2.5 mm, respectively.

The target for total solids is 50 weight %. The control, 10% mixture, and the 20% mixture have a solids content of about 53 to 56 weight % solids. Clearly, the acid-insoluble solids content increases with a higher amount of ground mixture. Thus, the control has about 1.6% acid-insoluble solids, the 10% mixture has approximately 6.6% acid-insoluble solids, and the 20% mixture has approximately 11% acid-insoluble solids. Solely by using the acid soluble solids and knowing the composition of the filled virgin asphalt mixture and the ground mixture within the recycled roofing material, the ground mixture content within the recycled roofing material can be calculated ("% recycle added based on Acid-Insoluble Solids" in Table 2). The 10% mixture is calculated to be approximately 10 weight % ground mixture, and the 20% mixture is calculated to be approximately 19 weight % ground mixture. Thus, acid insoluble content can be used not only to determine the presence or absence of recycled roofing material, but it can also be used to estimate the amount of ground mixture within the recycled roofing material.

Viscosity decreases and penetration distance increases with increasing the ground mixture content. Stain distance is not significantly affected by the increased ground mixture content.

Particularly noteworthy is the tear strength as determined by the tear test. The tear test is performed in the machine direction (MD), which is substantially parallel to the direction in which the roofing product is principally moved during manufacturing, and the cross direction (CD), which is perpendicular to the machine direction. The tear strength in both directions decreases with an increasing ground mixture content. With respect to CD, the tear strength of the control roofing product is approximately 1800 grams, which is above the specification of 1700 grams. However, the tear strength decreases to 1400 and 1300 grams for the 10% mixture and the 20% mixture, respectively. The solids from recycled roofing articles can include abrasive particles that are believed to fracture or scratch the fiberglass mat and lead to premature tearing in the CD and MD at levels below that seen with the control.

Table 3 below include data for a roofing product similar to the roofing product in Table 2, except that the fiberglass mat is replaced with a polyester mat and the filled virgin asphalt mixture includes 10 weight % of SBS polymer. The tear test for the roofing products in Table 3 was performed as a notched tear in order to initiate tearing. This tear test can be determined using ASTM D-4073, as modified in ASTM D-5147-07b.

TABLE 3

|  |  | Target | Control | 10% mixture | 20% mixture |
|---|---|---|---|---|---|
| Softening Point (° F.) |  | 260-290 | 256 | 255 | 247 |
| Viscosity @ | 350° F. |  | 4375 | 4375 | 3625 |
| (cps) | 375° F. | 2800-4200 | 3000 | 2350 | 1825 |
|  | 400° F. |  | 2300 | 1600 | 1300 |
| Penetration (dmm) | 77° F. | 40-50 | 39 | 29 | 30 |
|  | 115° F. |  | 78 | 64 | 67 |
| Remaining Solids (wt %) |  | 30.0% | 27.4% | 31.2% | 33.6% |
| Acid-Insoluble Solids (% of Remaining Solids) |  |  | 1.61 | 12.1 | 20.8 |
| % recycle added based on acid-insoluble solids |  |  |  | 13.0% | 25.7% |
| Stain (¹⁄₆₄s of an inch) |  |  | 3 | 3 | 4 |
| Tear Test (lbf) | CD |  | 55 | 75 | 70 | 70 |
|  | MD |  | 55 | 120 | 110 | 120 |

Information in the Table 3 can be expressed in metric units. The softening point of Control, 10% mixture, and 20% mixture are approximately 124° C., 124° C., and 119° C., respectively. The temperatures for determining the viscosities are approximately 177° C., 191° C., and 204° C., and the temperatures for determining the penetrations are approximately 25° C. and 46° C. The stain distance of Control, 10% mixture, and 20% mixture are approximately 1.2 mm, 1.2 mm, and 1.6 mm, respectively.

Many of the trends seen with the roofing products in Table 3 are similar to those seen with the roofing products in Table 2. However, the trend seen with the tear test for the roofing products in Table 3 differs from trend seen with the tear test for the roofing products in Table 2. The tear strength of the roofing products with recycled roofing material is similar to the tear strength of the roofing product without any recycled roofing material. Therefore, abrasive particles, which can scratch glass, do not have a significantly adverse affect on the roofing products that include a polyester mat for a base material.

In summary, with respect to preparation of the recycled roofing material, many different materials, content of those materials, particular actions in preparing the recycled roofing material, or any combination thereof are disclosed. After reading this specification, skilled artisans will appreciate that preparing the recycled roofing material can be modified to include other materials, content of those materials, particular actions in preparing the recycled material, or any combination thereof to meet the needs or desires for a particular applications.

Preparation of the bituminous material at block 104 can include combining and heating the components for the bituminous material (e.g., virgin asphalt, filled virgin asphalt mixture, recycled roofing material, a filler, an additive chemical, another component, or any combination thereof) to a temperature above the softening point of the asphalt. The components can be first combined and then heated, or the asphalt can be heated, and then the other components can be added to the softened asphalt. After reading this specification, skilled artisans appreciate that the order of heating, combining or otherwise introducing components in forming the bituminous material can be chosen to meet the needs or desires for a particular application. The bituminous material can be prepared in a conventional or proprietary apparatus used in preparing asphalt for use in roofing products.

When a bituminous material includes recycled roofing material, one or more operations may be different as compared to when a bituminous material does not include any recycled roofing material. Any of the components for the recycled roofing material can be initially processed before such component is used. For example, recycled roofing articles may have roofing nails or other undesired items removed. Recycled roofing articles may or may not be cut or shredded to reduce the individual sizes of the roofing articles. In one particular embodiment, recycled roofing articles are reduced in size to dimensions of about 10 cm×15 cm (4"×6") prior to adding to the media mixer. In other embodiments, the recycled roofing articles may be larger or smaller in size. The virgin asphalt, filled virgin asphalt mixture, or chemicals may be preheated. Other initial processing may be performed as needed or desired.

At block 106, the method includes filling the open structure of the base material provided at block 102. The open structure of the base material may be substantially completely filled with low recycled content or high recycled content bituminous material prepared at block 104, depending on the material of the base material, whether the base material provides principal support for the roofing product, or a combination thereof, as explained previously. The outermost portions of the base material within the saturated base material may or may not be exposed. In an embodiment, the volume of the bituminous material used to fill the open structure is greater than a perimeter volume of the base material. In another embodiment, the volume of the bituminous material used to fill the open structure is no greater than the perimeter volume of the base material.

In a particular embodiment, with respect to the base material within the saturated base material, a portion of a principal surface of the base material may be exposed; however, most of the structure or volume of the base material is embedded within or saturated with the bituminous material used to fill the open structure. Thus, if a ceramic base material is scratched or abraded at this point or later in the process, such a scratch or an abrasion will have a lesser effect on the properties of the finished roofing product, as compared to a roofing product where a substantial amount of abrasive particles would lie within interior portions of the open structure of the ceramic base material (e.g., when a substantial amount of abrasive particles, e.g., fine roofing granules, sand, fiberglass mat particles, etc., from recycled roofing articles would be used in the bituminous material).

Advancing to block 108, after filling the open structure of the base material, the method can further include applying a coating to a principal surface of the base material, where the coating includes the high recycled content bituminous material or the low recycled content bituminous material. The coating can be applied as a film, can be applied via a lamination technique, or can be applied via another suitable process. At decision node 110, a determination can be made regarding whether an additional coating is to be applied. If no additional coating is to be applied, the method can proceed to block 114.

On the other hand, an additional coating can be applied at block 112. The additional coating can be of the same or different composition as the coating applied at block 108. Further, more than one coating can be applied to the same or opposite principal surfaces of the roofing product. In a particular example, the coating applied at block 108 can include the low recycled content bituminous material, and the additional coating can include a coating of filled virgin asphalt mixture, a coating that includes the high recycled content bituminous material, a coating that includes any other amount of recycled roofing material, another coating, or any combination thereof. In another example, the coating applied at block 108 can include any amount of recycled roofing material, and the additional coating can include the low recycled content bituminous material. In yet another example, the additional coating applied at block 112 can include a coating formed from the high recycled content bituminous material and a coating formed from the low recycled content bituminous material, where the coating formed from the high recycled content bituminous material is disposed between the coating applied at block 108 and the coating formed from the low recycled content bituminous material.

The compositions of the coatings applied at blocks 108 and 112 can be used to increase a thickness of the roofing product, to make the roofing product stiffer, to make the roofing product more extensible, to make the roofing product more impact resistant, or any combination thereof. The additional coating applied in block 112 can provide combinations of stiffness, extensibility or other synergistic properties that allow a roofing product to have good support characteristics and still maintain good resistance to damage from objects that hit the roofing product, such as hail or tools dropped onto the roof. Examples of coatings having different elasticities that together provide combinations of structural support and impact resistance are described in U.S. Patent App. Pub. No. 2005/0204675, which is incorporated herein by reference for its teachings on elasticity and impact resistance. In one embodiment, a sheet of the roofing product that is closer to a roofing support structure can be more extensible, such that it accommodates impacts through its dissipative properties.

In a particular embodiment, the coating applied at block 108 can include a less oxidized region and a more oxidized region before the roofing product is installed on a structure. The less oxidized region can be disposed between the more oxidized region and the base material. In one example, the more oxidized region can occupy at least approximately 10% of a thickness of the first coating, such as at least approximately 25% of the thickness of the first coating. In another example, the more oxidized region can occupy at most approximately 80% of a thickness of the first coating, such as at most approximately 50% of the thickness of the first coating.

The combination of the base material, the coating applied at block 108 and any additional coating comprises a sheet of a roofing product. After a last coating is applied at block 108 or 112, the method moves to block 114, and a finishing operation is performed on the sheet. The finishing operation includes applying roofing granules, a parting agent or other particles to an exposed surface of the roofing product; applying an adhesive or a release sheet to an exposed surface of the roofing product; oxidizing an exposed surface of a coating at a temperature higher than a temperature used in forming the coating; exposing an exposed surface of a coating to a source of actinic radiation; another suitable finishing operation, or any combination thereof, to an exposed surface of the roofing product.

In one embodiment, the sheet can include a roofing shingle, and the finishing operation can include application of roofing granules or other particles. Roofing granules can be used for ultraviolet radiation protection, coloration, aesthetics, impact resistance, fire resistance, another suitable purpose, or any combination thereof. The roofing granules can include inert base particles that are durable, inert inorganic mineral particles, such as andesite, boehmite, coal slag, diabase, metabasalt, nephaline syenite, quartzite, rhyodacite, rhyolite, river gravel, another suitable inert material, or any combination thereof. In another embodiment, the roofing granules can include recycled roofing material particles.

The roofing granules can also include a granule coating over the inert base particles. A granule coating can cover at least approximately 75% of the surface of the inert base particle, and may cover at least approximately 90% of the surface of the inert base particle. In a particular embodiment, the granule coating continuously covers the surface of the inert base particle, and such granule coating has a substantially uniform thickness. If more than one granule coating is used, a subsequent granule coating may cover an underlying granule coating to the extent described with respect to the inert base particles.

If more than one granule coating is used, a granule coating closer to the inert base particle can include a binder that can be inorganic or organic. An inorganic binder can include a silicate binder, a titanate binder, a zirconate binder, an aluminate binder, a phosphate binder, a silica binder, another suitable inorganic binder, or any combination thereof. An organic binder can include a polymeric compound. In a particular embodiment, an organic binder can include an acrylic latex, polyurethane, polyester, silicone, polyamide, or any combination thereof. One or more additional organic binders of the same or different composition can be used.

A granule coating can include an algaecide or another biocide to help reduce or delay the formation of algae or another organic growth. The algaecide or other biocide can include a triazine, a carbamate, an amide, an alcohol, a glycol, a thiazolin, a sulfate, a chloride, a quaternary ammonium compound, copper, a copper compound, zinc, a zinc compound, another suitable biocide, or any combination thereof. In a particular embodiment, the algaecide or other biocide can be included within an inorganic granule coating binder. For example, the algaecide or other biocide can be included within an alkali metal silicate binder. In another embodiment, the algaecide or other biocide can be included within an organic granule coating binder, such as a polymeric latex binder. A polymeric latex binder can include polyethylene, a polyolefin, an acid-containing polyolefin, ethylene vinyl acetate, an ethylene-alkyl acrylate copolymer, a polyvinylbutyral, polyamide, a fluoropolymer, an acrylic, a methacrylate, an acrylate, polyurethane, another suitable binder material, or any combination thereof. Alternatively, the binder may include a solvent-based material, a radiation-curable material, or a two-part reactive material. These alternative materials may likewise include any of previously described polymeric materials. The same or different algaecide or other biocide can be used within different granule coatings. An algaecide or another biocide is not required to be present in every granule coating of the roofing granules.

A granule coating can include a solar reflective material that helps to reflect at least some of the solar energy. For example, UV radiation can further polymerize or harden the roofing product as the roofing product is exposed outdoors over a long period of time. A solar reflective material can include titanium dioxide, zinc oxide, or the like. Alternatively, the solar reflective material can include a polymeric material. In an embodiment, a polymer can include a benzene-modified polymer (e.g., copolymer including a styrene and an acrylate), a fluoropolymer, or any combination thereof. Other solar reflective materials are described in U.S. Pat. No. 7,241,500 and U.S. Publication Nos. 2005/0072110 and 2008/0220167, all of which are incorporated by reference for their teachings of materials that are used to reflect radiation (e.g., UV, infrared, etc.) from the sun.

A granule coating can include a colorant or another material to provide a desired optical effect. The colorant or other material can include a metal oxide compound, such as titanium dioxide (white), zinc ferrite (yellow), red iron oxides, chrome oxide (green), and ultramarine (blue), silver oxide (black), zinc oxide (dark green), or the like. In another embodiment, the colorant or other material may not be a metal-oxide compound. For example, the colorant may include carbon black, zinc or aluminum flake, or a metal nitride.

An additional granule coating may be used for a different purpose not described herein. The additional granule coating can have the same composition, a similar composition, or a different composition, as compared to the granule coating over the inert base particles of the roofing granules. For example, the additional granule coating can include a different oxide, nitride, oxynitride, carbide, or any combination thereof. After reading this specification, skilled artisans will be able to determine if an additional function or purpose is to be served by the roofing granules and whether an existing granule coating or material within a granule coating serves such a function or purpose or if an additional granule coating or an additional material within an existing granule coating would be needed or desired.

More than one type of roofing granule can be used in a roofing product. Thus, roofing granules can have a characteristic hardness. The hardness of each roofing granule can be the hardness of the material along an exposed surface of the roofing granule. If no coating is used, the hardness of a particular roofing granule can be the hardness of the inert base particle for that particular roofing granule. If a granule coating is used, the hardness of the particular roofing granule can be the hardness of the granule coating lying along the exposed surface of that particular roofing granule. For a set of roofing granules, the characteristic hardness can be an averaged hardness, such as an average, a geometric mean, or a median. Alternatively, the characteristic hardness may be expressed as a percentile. For example, the characteristic hardness may be a $10^{th}$ percentile, $25^{th}$ percentile, or other percentile value. For a $10^{th}$ percentile value, the characteristic hardness would mean that 10 percent all other roofing granules are as hard as or harder than a particular hardness. In still another embodiment, the characteristic hardness can be the highest hardness for the roofing granules within the set. In another embodiment, the characteristic hardness may be determined using a different criterion.

In an embodiment, the roofing granules can make up at least approximately 5 weight %, 8 weight %, or 11 weight % of the substantially completed roofing product, and in another embodiment, the roofing granules may make up no greater than approximately 60 weight %, 50 weight %, or 45 weight % of the substantially completed roofing product.

In addition to or in place of applying roofing granules, another finishing operation can be performed. For example, after roofing granules are applied, another granule coating (not illustrated), similar to any single or combination of binders and granule coatings previously described with respect to the roofing granules, may be applied onto the roofing product after roofing granules have been applied. Such binder or granule coating may have a solar reflective property, an algaecide or other biocide, a pigment or another appearance modifier, or any combination thereof as previously described.

In a particular embodiment, the finishing operation can include dispensing a parting agent onto another exposed surface of the roofing product, such as on another principal surface of the base material where the roofing product includes a shingle. The parting agent helps to keep the finished roofing product from sticking to itself on a take-up spool or sticking to other manufacturing equipment during subsequent manufacturing. The parting agent can include particles of sand, talc, limestone, slag, another relatively inert material, or any combination thereof. In another embodiment, the parting agent can include recycled roofing material having a different recycled roofing content as compared to a coating of the roofing product.

In another embodiment, the finishing operation can include a finishing operation adapted to oxidize or harden an exposed surface of the roofing product. In a particular example, the finishing operation can include oxidizing an exposed surface of the roofing product at a temperature higher than a temperature used in forming an exposed coating of the roofing product. In another example, the finishing operation can include exposing an exposed surface of the roofing product to a source of actinic radiation, such as ultraviolet radiation. In a particular embodiment, a lamp or other source may emit radiation at an emission maximum below approximately 400 nm. The lamp can be used to expose the roofing product to significantly higher radiation than would be achieved by exposure to the sun or incandescent or fluorescent lights. In another embodiment, a source of actinic radiation is an electron beam. In yet another embodiment, actinic radiation is provided by a gamma radiation source.

In another example, the finishing operation may include applying a chemical hardening agent to an exposed surface of the roofing product. Such hardening agent can include a peroxide, ozone, an acid, a base, another suitable hardening agent, or any combination thereof. In still another embodiment, the roofing product can be exposed to an oxygen-containing plasma.

Any or all of the finishing operations described herein may oxidize or further crosslink compounds under the treated surface of the roofing product. In one embodiment, the thickness of the roofing product affected may be at least approximately 10% or 25% of the roofing product, and in another embodiment, may be at most approximately 80% or 50% of the thickness of the roofing product.

In still another embodiment, no finishing operation may be performed, only one or some, but not all, of the previously-described finishing operations may be performed, or another finishing operation may be performed in addition to or in place of another finishing operation as previously described. In this shingle manufacturing embodiment, a stamping or other apparatus may be used to transform the roofing product into shingles. In a particular embodiment, the roofing product on the take-up spool can be moved to another apparatus so that shingles can be stamped out of the material. Alternatively, the take-up spool may not be used, and a stamping stage may be used in its place. After reading this specification, skilled artisans will be able to configure a manufacturing line for the particular roofing product being formed.

In another embodiment, the roofing product can include a membrane-type roofing product. The membrane-type roofing product is typically a self-adhesive product, although this is not a requirement. Roofing granules may or may not be dispensed onto the membrane-type roofing product. The membrane-type roofing product may be applied directly to a roof deck as a base sheet or an underlayment. In this particular application, an adhesive can be applied to the other side of the base material (the side opposite the coating). The adhesive can be used to provide a good seal to help reduce the likelihood of water damage from ice dams. The adhesive can include a tackifier, such as polyvinylbutyral, a pressure sensitive adhesive, another suitable compound, or any combination thereof. A pressure sensitive adhesive can include a silicone, a rubber, an acrylate, or the like. In a particular embodiment, a styrene-isoprene-styrene rubber composition can be used. In another particular embodiment, a polymer-modified bitumen adhesive can be used. A release sheet can be applied to the adhesive, such that the adhesive is disposed between the release sheet and the base material.

In an alternative embodiment, an adhesive modifier can be added to the low recycled content or high recycled content bituminous material within a coating of the membrane-type roofing product that is to contact a structure. Thus, a separate adhesive application operation may be eliminated. In this particular embodiment, the release sheet would be applied to the surface having the adhesive-modified bituminous material.

Figure 4:
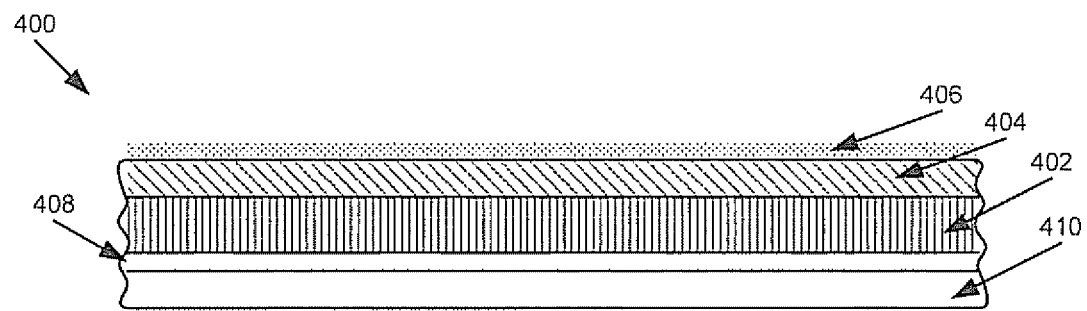
FIG. 4 includes an illustration of a cross-sectional view of a roofing product in accordance with an embodiment.
Figure 5:
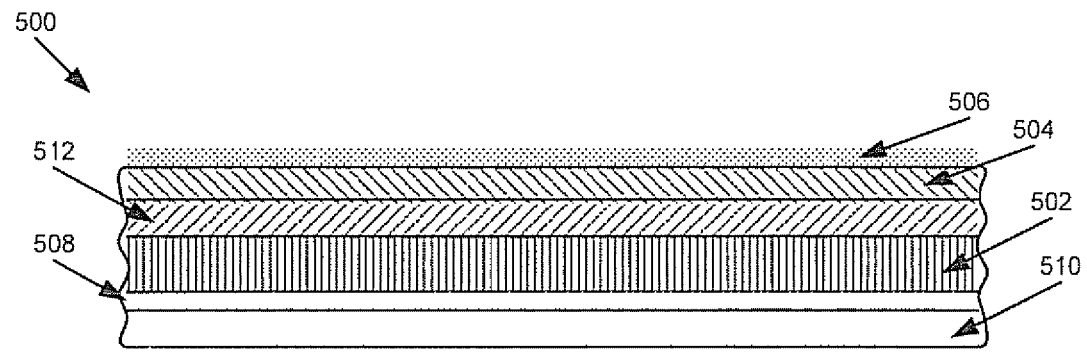
FIG. 5 includes an illustration of a cross-sectional view of a roofing product in accordance with another embodiment.
Figure 6:
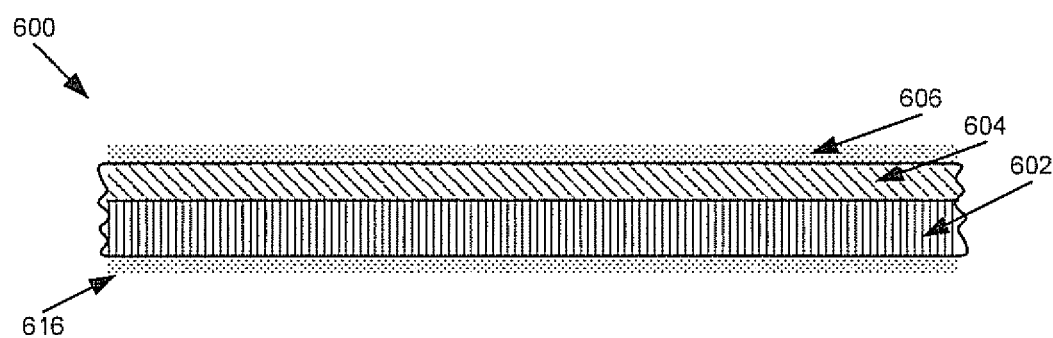
FIG. 6 includes an illustration of a cross-sectional view of a roofing product in accordance with a further embodiment.

FIGS. 4 to 6 include exemplary, non-limiting embodiments of roofing products that can be made, for example, using the process described with respect to FIG. 1. FIG. 4 illustrates a cross-sectional view of a roofing product 400 that includes a base 402 in which a material is embedded or saturated within the open structure of a base material, such as a fiberglass mat or another base material. If the base 402 provides principal support, such as when the roofing product 400 is a finished roofing product, the bituminous material used to fill the open structure depends on the base material. For instance, if the base material is fiberglass and the base 402 provides principal support for the roofing product 400, a non-abrasive material can be used to fill the open structure, in order to prevent scratching of the fiberglass. For example, limestone particles, talc, clay, non-abrasive coal fines, gypsum, calcite, roofing granules in amounts described with respect to FIG. 1, virgin asphalt or filled virgin asphalt mixture, another similar material, or any combination thereof can be used with a fiberglass mat providing principal support for the roofing product.

Alternatively, if the base material includes a harder material (such as, alumina or another material) or does not provide principal support for the roofing product 400, a relatively more abrasive material can be used to fill the open structure of the base 402. For instance, limestone particles, sand, the low recycled content bituminous material, the high recycled content bituminous material, roofing granules, other similar abrasive filler materials, or any combination thereof, can be used as to fill the open structure of the base 402.

A coating 404 is disposed on a principal surface of the base 402. The coating 404 can include low recycled content roofing material. Roofing granules 406 or other particles adapted to produce friction or to protect a bituminous coating can be disposed on an exposed surface of the coating 404, such that the coating 404 is disposed between the roofing granules 406 and the base 402. In another embodiment (not illustrated), the roofing product 400 may be used as an underlayment, such that roofing granules 406 are not used. In a particular embodiment, the roofing product 400 can include a roofing membrane, and an adhesive 408 can be disposed on another principal surface of the base 402. A release sheet 410 can be disposed on a surface of the adhesive 408 that is opposite the base 402.

In another embodiment, the base 402 and the coating 404 can together constitute a sheet that may be combined with other sheets, as described in further detail later in this specification. Where the base 402 and the coating 404 constitute such a sheet, the roofing granules 406, the adhesive 408, the release sheet 410, or any combination thereof can be eliminated from, or otherwise not used in, the roofing product 400.

FIG. 5 includes in illustration of a cross-sectional view of another roofing product 500. The roofing product 500 includes a base 502 in which a material is embedded or saturated within the open structure of a ceramic base material or other base material. An abrasive property of the material used to fill the open structure can depend on a hardness of the base material used in the base 502. A plurality of coatings 504 and 512 are disposed on the base 502. For example, an intermediate coating 512 can be disposed on a principal surface of the base 502 and can be disposed between the base 502 and the coating 504.

In one embodiment, the coating 504 can include low recycled content bituminous material, and the intermediate coating 512 can include the high recycled content bituminous material or can include a coating that contains any amount of recycled roofing material, such as less than approximately 80 weight % of recycled roofing material, less than approximately two-thirds by weight of recycled roofing material, less than approximately 50 weight % of recycled roofing material, less than approximately one-third by weight of recycled roofing material, or no recycled roofing material.

Roofing granules 506 or other particles adapted to produce friction or to protect a bituminous coating can be disposed on an exposed surface of the coating 504, such that the coating 504 is disposed between the roofing granules 506 and the intermediate coating 512. In another embodiment (not illustrated), the roofing product 500 may be used as an underlayment, such that roofing granules 506 are not used. In a particular embodiment, the roofing product 500 can include a roofing membrane, and an adhesive 508 can be disposed on another principal surface of the base 502. A release sheet 510 can be disposed on a surface of the adhesive 508 that is opposite the base 502.

In another embodiment, the base 502 and the coatings 504 and 512 can together constitute a sheet that may be combined with other sheets, as described in further detail later in this specification. Where the base 502 and the coatings 504 and 512 constitute such a sheet, the roofing granules 506, the adhesive 508, the release sheet 510, or any combination thereof can be eliminated from, or otherwise not used in, the roofing product 500.

FIG. 6 illustrates a cross-sectional view of yet another roofing product 600 in the form of a shingle. The roofing product 600 includes a base 602 in which a material is embedded or saturated within the open structure of a base material. A coating 604 is disposed on a principal surface of the base 602. The coating 604 can include low recycled content bituminous material.

In another embodiment (not shown), the roofing product 600 can include a plurality of coatings. For instance, an additional coating may overlay the coating 604, such that the coating 604 is disposed between the additional coating and the base 602. In a further example, coatings that include the low recycled content bituminous material can be disposed on a plurality of principal surfaces of the base 602. In another example, a coating that includes the low recycled content bituminous material can be disposed on a side of the base 602 and another coating having any amount of recycled roofing material, or no recycled roofing material, can be disposed on another principal surface of the base 602. In still another example, an intermediate coating can be disposed between the base 602 and a coating of low recycled content bituminous material disposed on a principal surface, or a plurality of principal surfaces, of the base 602. Those skilled in the art will recognize that many combinations of coatings can be applied to one or both sides of the base 602 in addition to the coating 604 that includes low recycled content bituminous material.

Roofing granules 606 or other particles adapted to produce friction or to protect a bituminous coating can be disposed on an exposed surface of the coating 604, such that the coating 604 is disposed between the roofing granules 606 and the base 602. In a particular embodiment, the roofing product 600 can include a shingle, and a parting agent 616 can be disposed on another side of the base 602. The parting agent 616 is adapted to prevent the finished roofing product from sticking to itself on a take-up spool, for example, or sticking to other manufacturing equipment during subsequent manufacturing, or in a stack of bundled shingles. The parting agent 616 can include particles of sand, talc, limestone, slag, another relatively inert material, or any combination thereof.

In another embodiment, the base 602 and the coating 604 can together constitute a sheet that may be combined with other sheets, as described in further detail later in this specification. Where the base 602 and the coating 604 constitute such a sheet, the roofing granules 606, the parting agent 616, or any combination thereof can optionally be eliminated from, or otherwise not used in, the roofing product 600.

Figure 7:
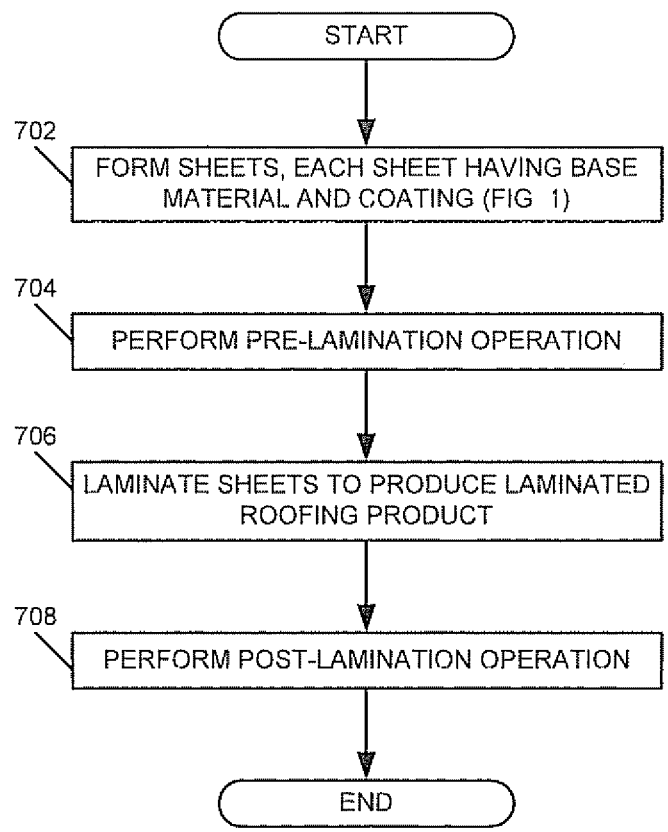
FIG. 7 includes a process flow diagram illustrating an exemplary method of forming a laminated roofing product.

FIG. 7 includes a process flow diagram illustrating an exemplary method of forming a laminated roofing product including a plurality of sheets. At block 702, a plurality of sheets is formed, each sheet having a base material and a coating. The coating can include the low recycled content bituminous material. In one embodiment, a sheet may be formed according to the process described with respect to FIG. 1. Each sheet may be similar to those roofing products 400, 500, or 600 illustrated in FIGS. 4-6. However, a sheet may or may not include a finishing component, such as roofing granules, an adhesive, a parting agent, a release sheet, or any combination thereof, before lamination.

Moving to block 704, a pre-lamination operation can be performed with respect to one or more of the sheets provided at block 702. The pre-lamination operation can include, for instance, heating a sheet, heating a coating on a sheet, heating a base of a sheet, or any combination thereof; applying an adhesive to a side of a sheet that will contact another sheet during lamination; slitting or otherwise cutting a sheet; cleaning using water or another solvent; adding a primer to a sheet; moving a sheet to align with another sheet to which the sheet will be laminated; another pre-lamination process; or any combination thereof. In another embodiment (not shown), no pre-lamination operation can be performed.

Proceeding to block 706, the sheets are laminated together to form a laminated roofing product. Laminating the sheets can include adhering the sheets together; curing an adhesive or other material disposed between the sheets; vacuum laminating the sheets together; contacting a base or coating of a sheet with a heated coating or base of another sheet; applying a positive pressure to a sheet to keep it in contact with another sheet while the sheet, the other sheet, or any combination thereof, are heated or partially fluid; another laminating process; or any combination thereof. Examples of laminating roofing sheets are disclosed in U.S. Patent App. Pub. No. 2006/0265990, which is incorporated herein for its teachings on lamination processes.

Continuing to block 708, a post-lamination operation can be performed on the laminated product, such as those described with respect to finishing operations at block 114 in FIG. 1. In another embodiment (not shown), no post-lamination operation can be performed.

Figure 8:
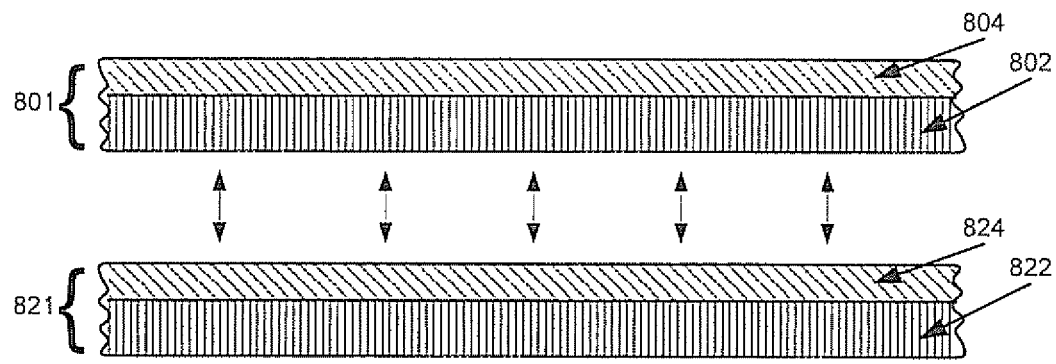
FIG. 8 includes an illustration of a cross-sectional view of sheets of intermediate roofing product before the sheets are laminated together into a laminated roofing product in accordance with an embodiment.
Figure 9:
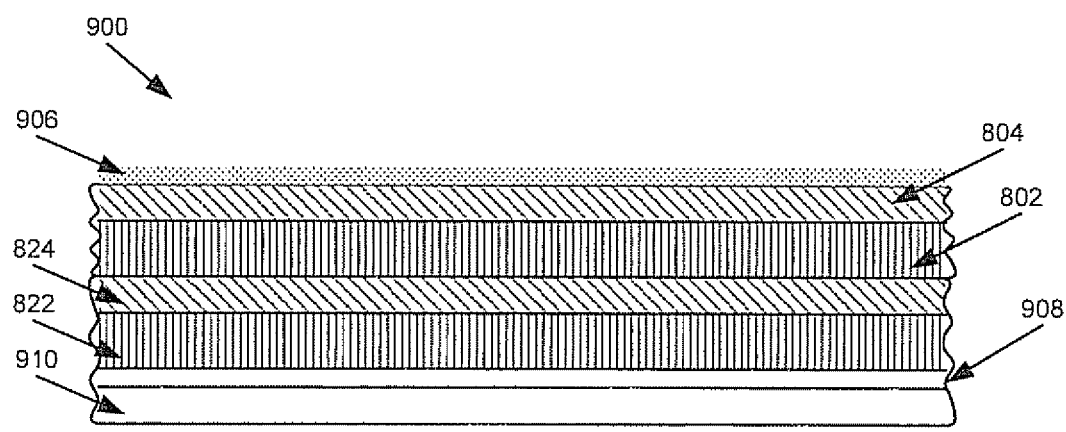
FIG. 9 includes an illustration of a cross-sectional view of a laminated roofing product formed after laminating the sheets of FIG. 8 and completing a finishing operation in accordance with another embodiment.

FIG. 8 includes an illustration of a cross-sectional view of sheets of intermediate roofing product before the sheets are laminated together into a laminated roofing product in accordance with an embodiment. For instance, a sheet 801 can include a base 802 and a coating 804, and another sheet 821 can include another base 822 and another coating 824. The sheets 801 and 821 can be laminated together to form a laminated product, such as the laminated roofing product 900 illustrated in FIG. 9, wherein a base, such as the base 822 provides principal support for the roofing product and the base 802 does not provide principal support for the roofing product. In this embodiment, the open structure of the base 822 can be filled with a non-abrasive material if the base 822 includes fiberglass, for example, and the open structure of the base 822 can be filled with an abrasive material if the base 822 includes a harder material, such as alumina. Further, the open structure of the base 802 can be filled with an abrasive material or a non-abrasive material, as the base 802 does not provide principal support for the laminated roofing product 900 and will not cause significant failure of the laminated roofing product 900 if the base material used in the base 802 is scratched by a material used to fill its open structure. In another embodiment, the base 802 can be filled with a non-abrasive material and the base 822 can be filled with abrasive material, such as recycled material, where the base 822 is included in an unexposed portion of the laminated roofing product 900.

In an illustrative embodiment, the laminated roofing product 900 can include roofing granules 906 on an exposed surface of the laminated roofing product 900. Additionally, where the laminated roofing product 900 is included in a roofing membrane, the laminated product can include an adhesive 908 and a release sheet 910. In another embodiment (not shown), the laminated roofing product 900 can include a roofing shingle and can include a parting agent. Other finishing operations may be performed on the laminated roofing product 900, as previously described with respect to finishing operations at block 114 in FIG. 1.

After reading this specification, skilled artisans will appreciate that many other roofing products can be made using the concepts as described herein. The particular materials, coatings, processes, and other parameters can be tailored for the roofing products that are needed or desired.

Embodiments as described herein can be used to produce a roofing product that includes complementary coatings, wherein each coating provides a particular benefit, whereas another coating compensates for a detriment associated with the coating that provides the particular benefit. For example, bituminous material containing recycled roofing material helps to reduce the need for asphalt made from crude oil and potential land fill space occupied by old roofing materials from a structure that was torn down or re-roofed. However, high recycled content bituminous material forms a coating that may be stiffer and more brittle than roofing material that only includes virgin asphalt as its asphalt source. Low recycled content bituminous material can have a lower content of or no recycled roofing articles, more virgin asphalt or filled virgin asphalt mixture, a higher additive chemicals content (particularly, a plasticizer), or any combination thereof.

Thus, the low recycled content bituminous material forms a coating that can be less stiff or brittle or more pliable. Nonetheless, the low recycled content bituminous material may use more virgin asphalt or filled virgin asphalt mixture, use more plasticizer, be more expensive as compared to the high recycled content bituminous material, or any combination thereof. The synergistic combination of the coatings can allow for a relatively lower cost roofing product to be formed that has acceptable impact resistance. Although two different types of coatings have been described, an additional type or still a different type of coating can be used within the roofing product to achieve desired properties.

As previously mentioned, embodiments can be used to help reduce waste. By recycling roofing articles, the roofing articles may be used to make new roofing products, rather than occupying valuable space within a landfill. Because roofing articles biodegrade relatively slowly, any reduction of roofing articles in a landfill helps the environment. Still further, roofing products produced with recycled roofing material may be less costly to produce. As the price of crude oil increases, the price of virgin asphalt also increases. Unlike virgin asphalt, the price of the roofing articles may slowly increase as environmental concerns may force scrapped roofing articles to be recycled. Thus, embodiments as described herein allow roofing products to be made at a lower cost as compared to roofing products formed without any recycled roofing articles.

Many different aspects and embodiments are possible. Some of those aspects and embodiments are described below. After reading this specification, skilled artisans will appreciate that those aspects and embodiments are only illustrative and do not limit the scope of the present invention.

In a first aspect, a roofing product can include a base material and a first coating adjacent to the base material. The first coating can include a recycled roofing material and the recycled roofing material can have a first recycled roofing content of less than 40 weight %. In an embodiment of the first aspect, the roofing product can include a bituminous material. The base material can include an open structure, and the bituminous material can substantially fill the open structure.

In another embodiment of the first aspect, the roofing product can include a second coating disposed between the first coating and the base material. The second coating can have a second recycled roofing content different from the first recycled roofing content.

In a further embodiment of the first aspect, the roofing product can include particles along an exposed surface of the roofing product. The particles can include recycled roofing particles.

In an additional embodiment of the first aspect, the roofing product can include an adhesive compound and a release sheet. The adhesive compound can be disposed between the base material and the release sheet, and the base material can be disposed between the first coating and the adhesive compound.

In another embodiment of the first aspect, before the roofing product is installed on a structure, the first coating can have a less oxidized region and a more oxidized region. The less oxidized region can be disposed between the more oxidized region and the base material, and the more oxidized region can occupy at least approximately 10% of a thickness of the first coating.

In yet another embodiment of the first aspect, the roofing product can include a parting agent disposed on another principal surface of the base material. The base material can be disposed between the first coating and the parting agent. The parting agent can include another recycled roofing material having a second recycled roofing content different from the first recycled roofing content.

According to a second embodiment, a roofing product can include a base material and a first coating including a bituminous material. The first coating can be adjacent to the base material. The roofing product can also include roofing granules along a first exposed surface of the roofing product. The roofing granules can include recycled roofing material particles.

In an embodiment of the second aspect, the roofing product can include a bituminous material substantially free of abrasive particles. The base material can include a ceramic base material having an open structure, and the bituminous material substantially fills the open structure. Further, a second coating can be disposed between the first coating and the base material, where the second coating includes a recycled roofing content.

In another embodiment of the second aspect, the roofing product can include other particles along another exposed surface of the roofing product opposite the first exposed surface, wherein the other particles include recycled roofing particles.

In another embodiment of the second aspect, the roofing product can include an adhesive compound and a release sheet. The adhesive compound can be disposed between the base material and the release sheet, and the base material can be disposed between the first coating and the base material.

In a further embodiment of the second aspect, before the roofing product is installed on a structure, the first coating can have a less oxidized region and a more oxidized region. The less oxidized region can be disposed between the more oxidized region and the base material, and the more oxidized region can occupy at most approximately 80% of a thickness of the first coating.

According to a third aspect, a method of forming a roofing product can include providing a base material and forming a first coating adjacent to the base material. The first coating can include a recycled roofing material, and the recycled roofing material can have a first recycled roofing content of less than 40 weight %.

In an embodiment of the third aspect, the base material can include a ceramic base material having an open structure, and the method can further include filling the open structure of the ceramic base material with a bituminous material before forming the first coating. The bituminous material can be substantially free of abrasive particles.

In another embodiment of the third aspect, the method can include forming a second coating adjacent to the base material before forming the first coating. The second coating can have a second recycled roofing content different from the first recycled roofing content.

In a further embodiment of the third aspect the method can include forming a second coating adjacent to the base material. The second coating can have a second recycled roofing content different from the first recycled roofing content, and in a finished roofing product, the base material can be disposed between the first and second coatings.

In another embodiment of the third aspect, the method can include applying particles along an exposed surface of the roofing product after forming the first coating. The particles can include recycled roofing material particles.

In another embodiment of the third aspect, the method can include applying an adhesive along an exposed surface of the roofing product after forming the first coating.

In yet another embodiment of the third aspect, the method can include oxidizing an exposed surface of the first coating at a temperature higher than a temperature used in forming the first coating.

In still another embodiment of the third aspect, the method can include exposing an exposed surface of the first coating to a source of actinic radiation.

According to a fourth aspect, a method of forming a roofing product can include providing a base material and forming a first coating including a bituminous material, where the first coating is adjacent to the base material. The method can also include applying particles along a first exposed surface of the roofing product after forming the first coating. The particles can include recycled roofing material particles.

In an embodiment of the fourth aspect, the base material can include a ceramic base material having an open structure, and the method can include filling the open structure of the ceramic base material with a base bituminous material before forming the first coating. The base bituminous material can be substantially free of abrasive particles.

In another embodiment of the fourth aspect, the method can include forming a second coating adjacent to the base material, before forming the first coating, and the second coating can have a recycled roofing content.

In another embodiment of the fourth aspect, the method can include applying an adhesive along an exposed surface of the roofing product after forming the first coating.

In another embodiment of the fourth aspect, the method can include oxidizing an exposed surface of the first coating at a temperature higher than a temperature used in forming the first coating.

In another embodiment of the fourth aspect, the method can include exposing an exposed surface of the first coating to a source of actinic radiation.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A roofing product comprising:
a base material;
a bituminous material having no greater than 1 weight % of abrasive particles, wherein the base material includes a ceramic base material having an open structure, and the bituminous material substantially fills the open structure;
a first coating adjacent to the base material, the first coating including a recycled roofing material, wherein the recycled roofing material has a first recycled roofing content of at least 5 weight % and less than 30 weight %; and
a second coating disposed between the first coating and the base material, wherein the second coating has a second recycled roofing content at least 5 weight % and different from the first recycled roofing content; and
an adhesive compound adjacent to the base material, the adhesive compound comprising a polyvinylbutyral, a silicone, an acrylate, a styrene-isoprene-styrene rubber, or any combination thereof.

2. The roofing product of claim 1, further comprising particles along an exposed surface of the roofing product, wherein the particles include recycled roofing particles.

3. The roofing product of claim 1, further comprising a release sheet, wherein the adhesive compound is disposed between the base material and the release sheet, and the base material is disposed between the first coating and the adhesive compound.

4. The roofing product of claim 1, wherein before the roofing product is installed on a structure, the first coating has a less oxidized region and a more oxidized region, wherein the less oxidized region is disposed between the more oxidized region and the base material, and the more oxidized region occupies at least approximately 10% of a thickness of the first coating.

5. The roofing product of claim 4, wherein the more oxidized region occupies at most approximately 80% of a thickness of the first coating.

6. The roofing product of claim 1, further comprising a parting agent disposed on a principal surface of the base material, wherein the base material is disposed between the first coating and the parting agent.

7. The roofing product of claim 6, wherein the parting agent includes another recycled roofing material having a second recycled roofing content different from the first recycled roofing content.

8. The roofing product of claim 1, wherein the roofing product is a membrane-type roofing product.

9. The roofing product of claim 1, wherein the roofing product is a shingle-type roofing product.

10. The roofing product of claim 1, wherein the recycled roofing material has a first recycled roofing content of less than 30 weight %.

11. A roofing product comprising:
a first base material;
a bituminous material having no greater than 1 weight % of abrasive particles, wherein the first base material includes a ceramic base material having an open structure, and the bituminous material substantially fills the open structure;
a first coating adjacent to the first base material, the first coating including a recycled roofing material, wherein the recycled roofing material has a first recycled roofing content of at least 5 weight % and less than 30 weight %;
a second base material adjacent to and in direct contact with the first coating;

a second coating adjacent to the second base material, the second coating including a recycled roofing material, wherein the recycled roofing material has a second recycled roofing content of at least 5 weight % and less than 40 weight %; and an adhesive compound adjacent to the first base material, the adhesive compound comprising a polyvinylbutyral, a silicone, an acrylate, a styrene-isoprene-styrene rubber, or any combination thereof.

12. The roofing product of claim 11, further comprising a third coating disposed between the second coating and the second base material, wherein the second coating has a second recycled roofing content different from the first recycled roofing content.

13. The roofing product of claim 11, further comprising particles along an exposed surface of the roofing product, wherein the particles include recycled roofing particles.

14. The roofing product of claim 11, further comprising a release sheet, wherein the adhesive compound is disposed between the first base material and the release sheet, and the first base material is disposed between the first coating and the adhesive compound.

15. The roofing product of claim 11, wherein before the roofing product is installed on a structure, the second coating has a less oxidized region and a more oxidized region, wherein the less oxidized region is disposed between the more oxidized region and the second base material, and the more oxidized region occupies at least approximately 10% of a thickness of the second coating.

16. The roofing product of claim 11, further comprising a parting agent disposed on a principal surface of the first base material, wherein the first base material is disposed between the first coating and the parting agent.

17. The roofing product of claim 16, wherein the parting agent includes another recycled roofing material having a second recycled roofing content different from the first recycled roofing content.

* * * * *